Patented Oct. 24, 1933

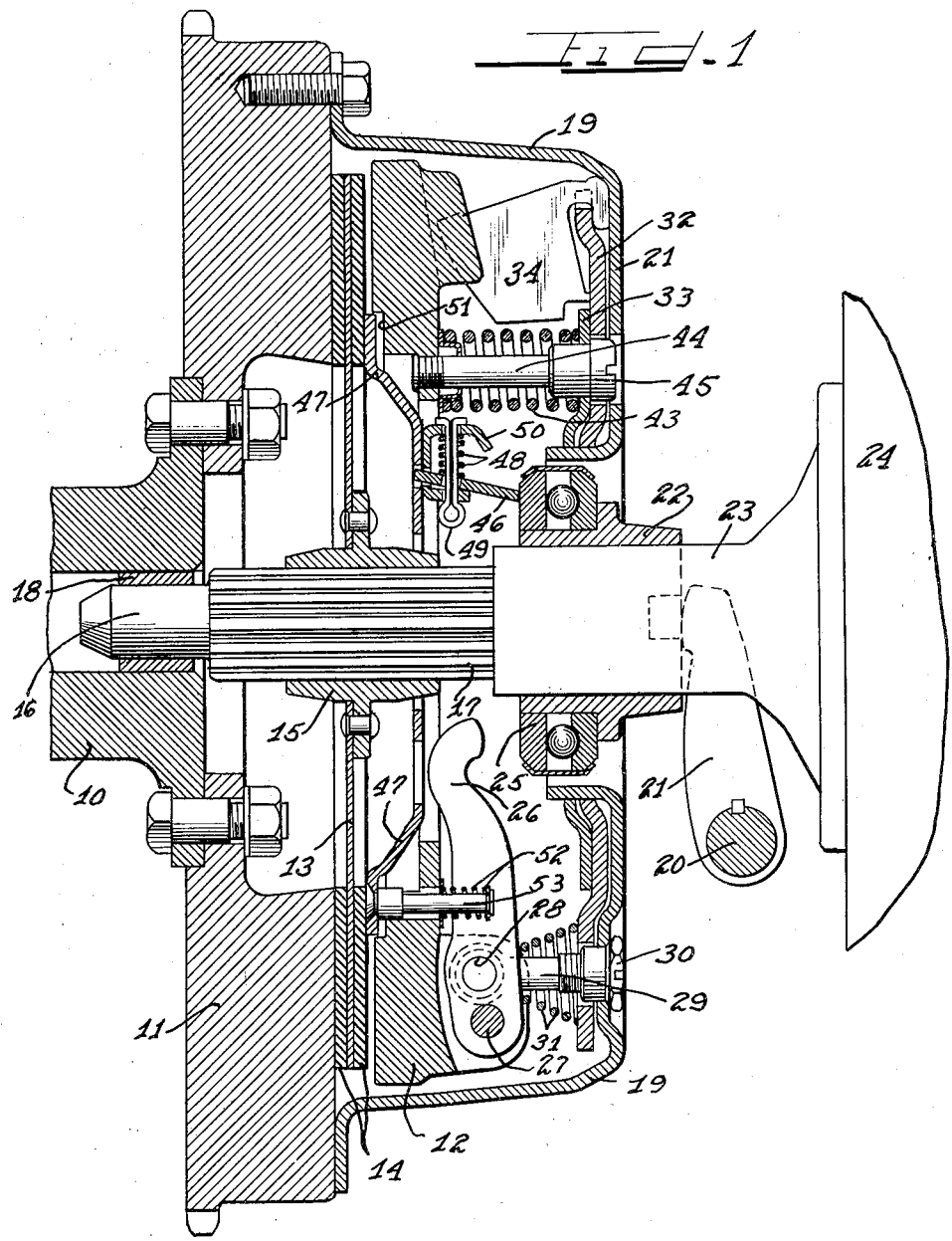

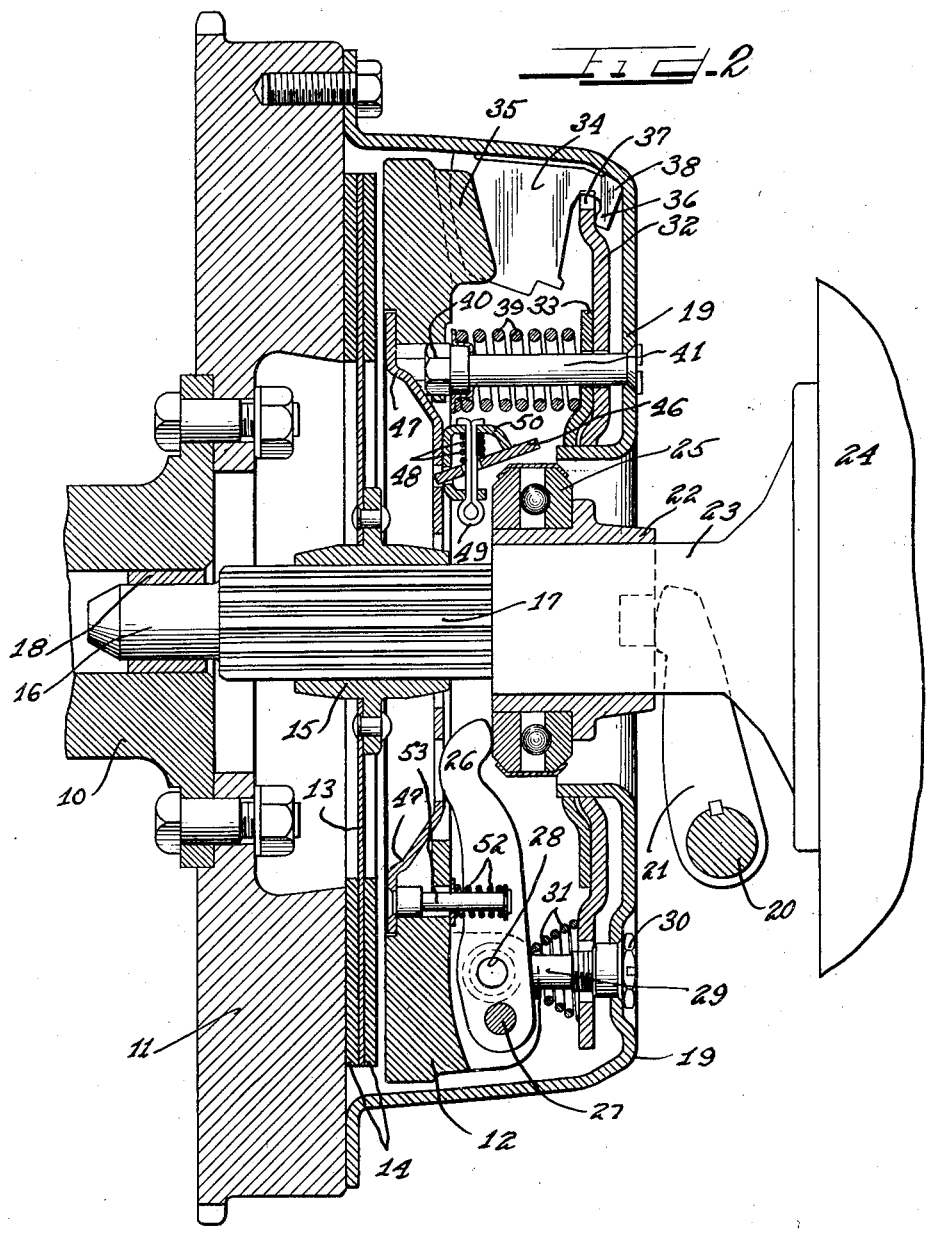

1,931,674

UNITED STATES PATENT OFFICE 1,931,674

AUTOMATIC CLUTCH

Harold Nutt and Harold V. Reed, Chicago, Ill., assignors to The Borg & Beck Company, a corporation of Illinois Application March 24, 1932. Serial No. 600,850

6 Claims. (Cl. 192—105)

This invention relates to automatically operating clutches wherein a driving member automatically picks up the load of a driven member upon reaching a predetermined rotative speed. For the purposes of this invention the particular type or mechanism by which engagement is secured is of relatively slight importance since our invention has to do with overcoming a defect common to all types of clutches which only operate at or above a predetermined rotative speed.

In automatic clutches designed to engage after a predetermined rotative speed has been reached it is obviously impossible to reverse the load to enable the normally driven member to pick up and start the normally driving member should that be desirable. As one example an automotive vehicle clutch has been chosen to illustrate one embodiment of this invention since in such service it is frequently desirable to be able to engage the clutch positively at the will of the driver should the engine have stopped or have failed to start in the usual manner. In an automatic clutch of the type described it thus becomes necessary to provide some means for engaging the clutch when the engine has stalled, during a period of free wheeling for example, so that the engine may be cranked by the momentum of the vehicle. This condition is often also experienced in cold weather when one vehicle can conveniently be used to push another in order to crank the engine of the latter when the battery has been run down. It is also desirable to provide some means of engaging the clutch, if the engine stalls when descending a hill with the clutch already disengaged. Since a clutch of the type mentioned operates automatically at predetermined rotative speeds of the driving member it also disengages automatically when the engine speed is slow or when it stops and this invention is directed to means whereby the engine can be picked up by the vehicle at the will of the operator.

This invention will be illustrated and described as applied to a centrifugal type of clutch more fully described and claimed in the copending application of Harold Nutt, Serial No. 597,691 filed March 9, 1932, but it is to be understood that we do not limit our invention to such a type of automatic or automotive clutch.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal vertical section through an automatic clutch of the centrifugal type wherein the main or centrifugal clutch is disengaged or inoperative while the lock out or auxiliary clutch of this invention has been illustrated as engaged.

Figure 2 is a section similar to Figure 1 wherein the centrifugal mechanism of the main clutch has been energized but the clutch is manually held disengaged by the usual clutch pedal mechanism.

As shown:

The automotive type of clutch chosen to illustrate one embodiment of this invention is of the single plate type although it is to be understood that our invention is not to be limited in application to the particular combination of conventional elements disclosed. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc carries the usual facing material 14 on both sides and is riveted to an internally splined hub 15. A transmission drive shaft 16 which forms the driven shaft of the clutch is provided with splines 17 on which the hub 15 slides and the shaft is journaled at its front end in a pilot bearing 18 axially located in the crankshaft. The pressure plate 12 and the operating mechanism therefor is enclosed in a casing or housing 19 bolted to the rear face of the flywheel.

The foregoing described structure is substantially the same as the well known Borg & Beck manually operated clutch wherein the pressure plate is urged against the clutch disc by spring pressure and is retracted by means of the usual clutch throwout lever acting on a shaft 20 having a fork 21 keyed thereto to shift a sliding collar 22 to the left on a sleeve 23 enveloping the transmission drive shaft 16 and secured to the transmission case 24. The collar 22 carries a thrust bearing 25 which contacts throwout fingers 26 pivoted at 27 to the pressure plate and fulcrumed at 28 in an adjustable eye bolt 29 having a nut 30 seated in the housing. The eye bolt carries a spring 31 bearing against the lever 26 to take up play therein. The adjusting nuts 30 are primarily provided to permit proper setting of the throwout fingers during manufacturing operations, but may be readjusted for wear in the clutch which might otherwise eventually require too great a travel of the clutch lever to secure full disengagement. Thus the clutch embodying this invention is manually operable in exactly the same way as the conventional clutch and has many parts in common therewith so that a manual clutch of the type described can be altered to operate automatically by the substitution and addition of the automatically operating mechanism to be now described.

Two spring mounting rings or spiders are provided, an outer secondary ring 32 which is adjacent the inner surface of the clutch housing 19 when the clutch is disengaged as in Figure 1, and an inner primary ring 33 normally seated thereon. This is because two distinct stages of operations are provided in the disclosed clutch, the primary spring ring 33 shifting in advance of the secondary ring at a predetermined rotary speed, followed by the secondary spring ring 32 at a higher rotative speed the secondary ring thus supplementing the primary spring ring to provide full engagement after a predetermined increase in rotative speed.

The spring rings 33 and 32 are advanced to the left by separate groups of weights 34. As shown herein only one weight is shown but it is to be understood that a plurality of these weights act against each of the spring rings and are conveniently formed as a plurality of thin stampings guided between bosses 35 on the pressure plate and having extension lugs 36 hooked over the back of the spring rings 32 and 33 in notches 37 in the periphery thereof, the heel 38 of the lugs being rounded and fulcrumed or bearing in the fillet at the corner of the housing. The weights are not restrained or pinned otherwise than by the housing and spring rings, and swing outwardly about the heel as a pivot until they contact against the housing under the action of centrifugal force, the swinging movement causing the toe of the lugs 36 to pry the spring rings to the left.

The primary and secondary rings are normally urged to the right in the figures by separate sets of retractor springs, one of which is shown in the upper part of Fig. 2. These springs 39 are provided to act against the primary ring 33, being located between the ring and nuts 40 on bolts 41, the heads of which seat on the housing as shown in the upper part of Figure 2. The secondary ring 32 is similarly retracted by springs not shown herein, which springs are chosen of greater total strength than the primary retractor springs. Thus the secondary retractor springs exert considerably greater total pressure than the primary retractor springs 39 and since both sets of springs resist the response of their associated weights the primary set of weights will respond to a lower rotative speed than the secondary set of weights. Since the spring forces are predetermined and can be varied by adjustments of the bolts and nuts the slip range of the clutch, between initial and complete engagement can be varied within wide limits to suit the requirements of different installations.

It is to be noted that the retractor springs do not bear against the pressure plate, their sole function being to control the operation of the centrifugal weights and to move the spring rings to the right when the rotative speed drops below the predetermined speeds at which each ring operates.

A third group of springs 43 shown in the upper part of Figure 1 are interposed between the pressure plate and the primary spring ring 33. Certain of these springs, as shown in Figure 1 have studs 44 disposed therein and secured to the pressure plate, the free end of the studs carrying a nut 45 which engages the back or right side of the primary spring ring 33. These studs are provided to secure parallelism of the pressure plate relative to the clutch disc and flywheel, and may also be utilized to control running clearances, while the pressure springs are so designed as to obtain an initial pre-loading to the desired total pressure. Thus if the centrifugal weights and the studs 44 were omitted a fully operative manual release clutch would result as the nine pressure springs are loaded to the desired engaging pressure to carry the designed torque. With the addition of the centrifugal weights and studs the clutch becomes automatic in action although the pressure is limited to that of the equivalent manual clutch no matter how great the centrifugal force becomes at high rotative speeds since the weights swing out against the housing and transmit any excess forces directly thereto without further effect on the automatic operation or manual release of the clutch.

The clutch is so proportioned that engagement occurs in two stages, the first stage involving the movement of the pressure plate and primary spring ring to the left as a unit without further compressing the pressure springs at a rotative speed corresponding to the adjustment of the retractor springs 39. During this stage the clutch running clearances are taken up and an initial light engagement of the clutch accomplished due to a partial outward movement of the primary centrifugal weights against the resistance of the retractor springs 39. The partial clutch engagement so accomplished serves to gradually pick up a load and a further increase of engine speed, after the clutch clearances have been so taken up, serves to energize the secondary centrifugal weights against the resistance of the secondary retractor springs to move the secondary spring ring 32 to the left. Up to this point while the pressure springs remain unaltered in length yet in practice the pressure developed by the leverage of the weights is sufficient to carry normal torque. A further increase in rotative speed causes both sets of weights to swing out against the housing, shifting both spring rings further to the left into the position of Figure 2 where the preloading of the pressure springs is transferred from the bolt heads 45 to the pressure plate to secure the full designed engaging pressure, which is sufficient to assure against slippage under abnormal conditions.

While the illustrated clutch closely resembles a conventional type of manually controlled clutch, and may have the same characteristics of clutch pressure and throwout mechanism, it differs therefrom in that it is automatically and smoothly engaged through a predetermined range of rotative speeds by means of centrifugal force which swings the two sets of weights outwardly from the position of Figure 1 to that of Figure 2, causing a movement of the spring rings to the left in the figures, towards the flywheel and clutch disc. The spring rings are normally held in the position of Figure 1 by the retractor springs and the spring rings in turn normally hold the pressure plate in fixed relationship wherein the pressure springs are compressed to a desirable initial pre-loading by means of the studs 44 and nuts 45.

From the foregoing description it will be evident that the clutch can be thrown out by the usual foot operated mechanism at engine speeds above the point where the clutch engages automatically, and that the load on the pedal required for making this release need not exceed that in an equivalent conventional clutch of the same capacity since in both types, the clutch throwout works against pressure springs the preloading of which determines the clutch capacity.

The foregoing clutch structure is more fully disclosed in the before-mentioned copending application of Harold Nutt and the present invention will be described in connection therewith since it relates to means for manually engaging an automatic clutch when the engine is dead and the normal clutch engaging mechanism is thus inoperative due to lack of centrifugal force for energizing the same. This invention is therefore to be understood to be capable of use with a wide range of designs of automatic clutches which automatically release when the driving member drops below a predetermined rotative speed.

The present invention comprises a supplementary clutch manually engageable by an inward movement of the clutch throwout bearing when the engine is dead. Thus this invention utilizes the clutch pedal at will to throw out the clutch when the engine is running or to engage the clutch when the engine has stopped.

This result is accomplished by providing centrifugally responsive struts 46 which are normally held interposed between an auxiliary pressure plate 47 and the throwout bearing 25 by springs 48. When the engine is running at idling speed or above, the struts are thrown outwardly into the position of Figure 2 by centrifugal force and then do not interfere with the normal use of the throwout bearing to disengage the clutch. However, when the engine has stopped the springs 48 swing the struts inwardly to the position shown in Figure 1. While these struts are shown as mounted on pins 49 in guide brackets 50 attached to the auxiliary pressure plate which latter is normally seated in a recess 51 in the main pressure plate, it is to be understood that this location is not essential, but is preferable since the manual pressure required to directly engage the clutch then acts directly on the auxiliary pressure plate and therefore does not have to first overcome the loading on the main pressure plate due to the retractor springs. The pressure plate 47 is normally held seated in its recess 51 in the main pressure plate by springs 52 which act on guide pins 53 riveted to the plate and extending through apertures in the main pressure plate. In order to simplify the drawings and description only single elements of each type have been shown it being understood that due to the necessity of running balance and the control of clearances a plurality of each of the various elements is necessarily implied.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. The combination with an automatic clutch embodying relatively movable coacting friction members and means responsive to the rotative speed of the driving member for moving said members into engagement above a predetermined rotative speed, manual means for disengaging said members, and an auxiliary manually engageable clutch structure associated with the automatic clutch comprising an auxiliary pressure plate carried by the driving member, and means carried thereby and interposable between said pressure plate and the manual means for disengaging the clutch members, whereby said manual means is adapted to be used to engage the auxiliary clutch structure.

2. The combination with an automatic clutch embodying relatively movable coacting friction members and means responsive to the rotative speed of the driving member for moving said members into engagement above a predetermined rotative speed, manual means for disengaging said members, and an auxiliary manually engageable clutch structure associated with the automatic clutch comprising an auxiliary pressure plate carried by the driving member, and means carried thereby and interposable between said pressure plate and the manual means for disengaging the clutch members, whereby said manual means is adapted to be used to engage the auxiliary clutch structure, said means being normally disposed in operative position when the driving member has stopped and being centrifugally unbalanced whereby to be thrown out of operative position when the driving member is rotating.

3. In combination an automatic clutch comprising driving and driven members, clutch engaging means comprising centrifugally responsive means for engaging the driving and driven members, and means for manually disengaging said driving and driven members at will, an auxiliary manually engageable clutch structure associated with the automatic clutch comprising an auxiliary pressure plate carried by the driving member, and means carried thereby and interposable between said pressure plate and the manual means for disengaging the clutch members, whereby said manual means is adapted to be used to engage the auxiliary clutch structure.

4. In combination an automatic clutch comprising driving and driven members, clutch engaging means comprising centrifugally responsive means for engaging the driving and driven members, and means for manually disengaging said driving and driven members at will, an auxiliary manually engageable clutch structure associated with the automatic clutch comprising an auxiliary pressure plate carried by the driving member, and means carried thereby and interposable between said pressure plate and the manual means for disengaging the clutch members, whereby said manual means is adapted to be used to engage the auxiliary clutch structure, said means being normally disposed in operative position when the driving member has stopped, and being centrifugally unbalanced whereby to be thrown out of operative position when the driving member is rotating.

5. The combination in a normally disengaged clutch automatically engageable above a predetermined rotative speed, and a manually controlled throwout mechanism therefor, of a secondary automatically retracted clutch structure cooperating with the first mentioned clutch and the manually controlled throwout mechanism whereby the said manually controlled throwout mechanism is adapted to be converted to a manually controlled engaging mechanism when said secondary clutch structure is in operative position.

6. The combination in a normally disengaged clutch automatically engageable above a predetermined rotative speed, and a manually controlled throwout mechanism therefor, of a secondary automatically retracted clutch structure cooperating with the first mentioned clutch and the manually controlled throwout mechanism whereby the said manually controlled throwout mechanism is adapted to be converted to a manually controlled engaging mechanism when said secondary clutch structure is in operative position.

HAROLD NUTT.
HAROLD V. REED.